(12) United States Patent
Roney

(10) Patent No.: US 8,998,777 B2
(45) Date of Patent: *Apr. 7, 2015

(54) OFFSET WEIGHT BARS

(75) Inventor: Chris Roney, Urbana, IL (US)

(73) Assignee: Chris Roney, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/331,612

(22) Filed: Dec. 20, 2011

(65) Prior Publication Data

US 2012/0220433 A1 Aug. 30, 2012

Related U.S. Application Data

(63) Continuation of application No. 12/838,303, filed on Jul. 16, 2010, now Pat. No. 7,945,615, which is a continuation of application No. PCT/US2009/058065, filed on Sep. 23, 2009.

(60) Provisional application No. 61/099,527, filed on Sep. 23, 2008, provisional application No. 61/184,549, filed on Jun. 2, 2009.

(51) Int. Cl.
| | |
|---|---|
| B62K 21/12 | (2006.01) |
| B25G 1/00 | (2006.01) |
| B25G 3/00 | (2006.01) |
| B62K 21/16 | (2006.01) |
| B62K 21/18 | (2006.01) |

(52) U.S. Cl.
CPC ... *B25G 1/00* (2013.01); *B25G 3/00* (2013.01); *B62K 21/12* (2013.01); *B62K 21/125* (2013.01); *B62K 21/16* (2013.01); *B62K 21/18* (2013.01)

(58) Field of Classification Search
CPC ............ B25G 1/00; B25G 3/00; B62K 21/12; B62K 21/125; B62K 21/26; B62K 21/13; B62K 21/18
USPC .......... 705/44; 482/34, 44–46, 49–50, 92–93, 482/106–109; 473/203–204; 16/421, 430; 294/57

See application file for complete search history.

(56) References Cited

U.S. PATENT DOCUMENTS

| | | | | |
|---|---|---|---|---|
| 1,229,658 | A | * 6/1917 | Sandow | 482/50 |
| 6,142,918 | A | * 11/2000 | Liu | 482/108 |

FOREIGN PATENT DOCUMENTS

| | | | |
|---|---|---|---|
| FR | 1503686 | * 12/1967 | |
| FR | 2711537 | * 5/1995 | A63B 21/02 |

* cited by examiner

*Primary Examiner* — Eric T Wong
*Assistant Examiner* — Clifford Madamba
(74) *Attorney, Agent, or Firm* — Woodard, Emhardt, Moriarty, McNett & Henry LLP

(57) ABSTRACT

An offset weight bar is provided which operates with the lifter's neuro-fascial connections to increase muscle activation and recruitment of muscle groups. The offset weight bar includes a grip portion that is shaped in accordance with the neuro-fascial connections in the lifter's hands and arms. The offset weight bar also offsets the weight of the bar from the lifter's palm to a point out along the lifter's unfolded fingers. The shape of the offset weight bar operates with the offset of the weight from the palm to increase the lifter's muscle activation and muscle group recruitment in accordance with the lifter's neuro-fascial physiology.

20 Claims, 13 Drawing Sheets

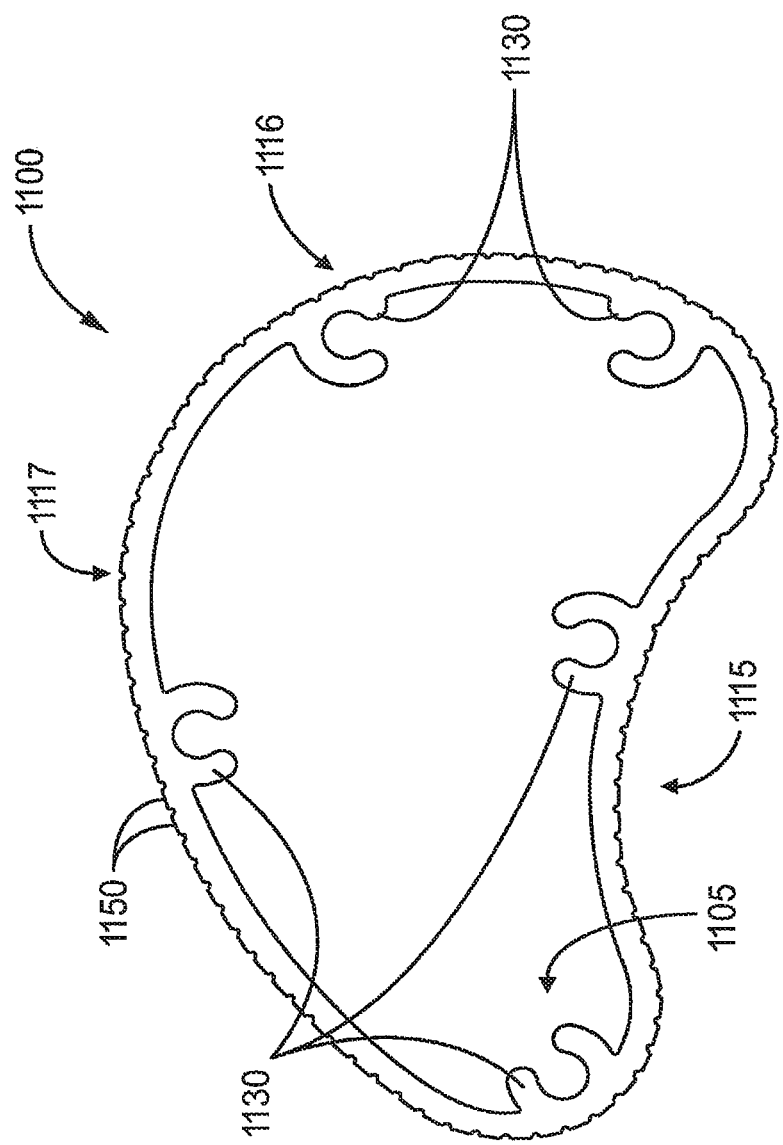

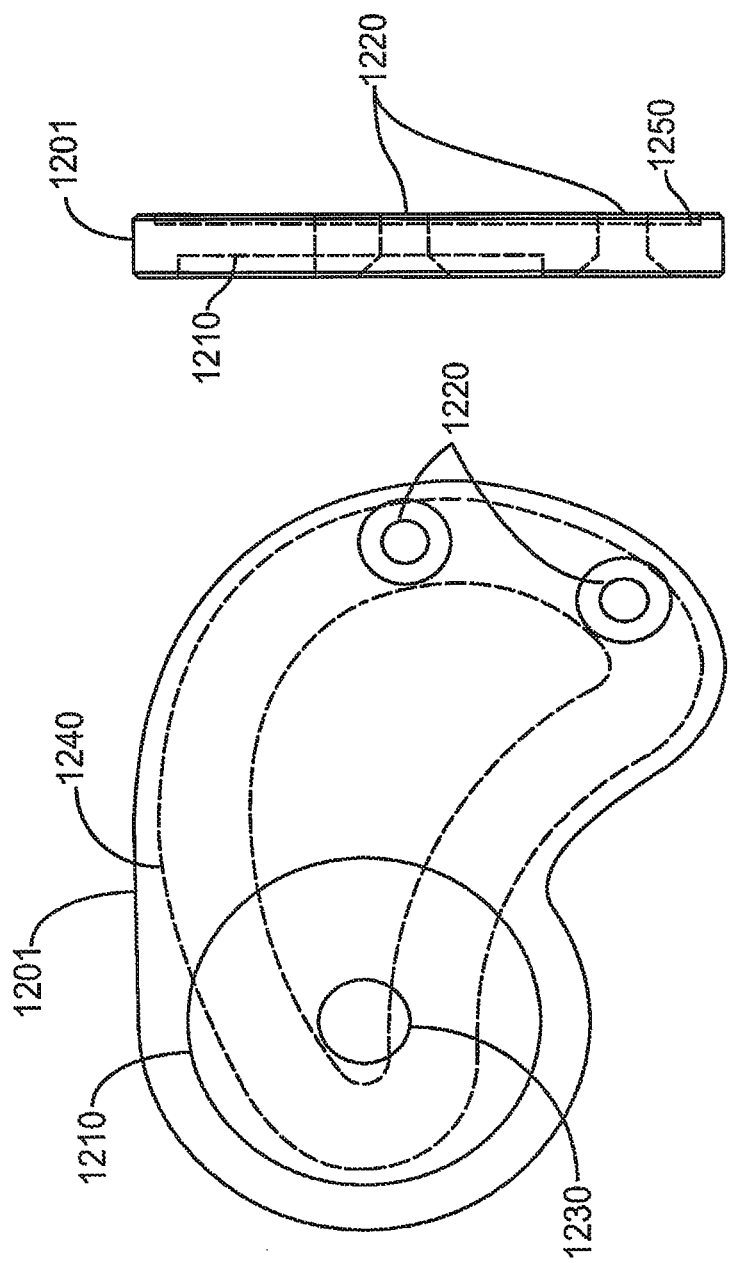

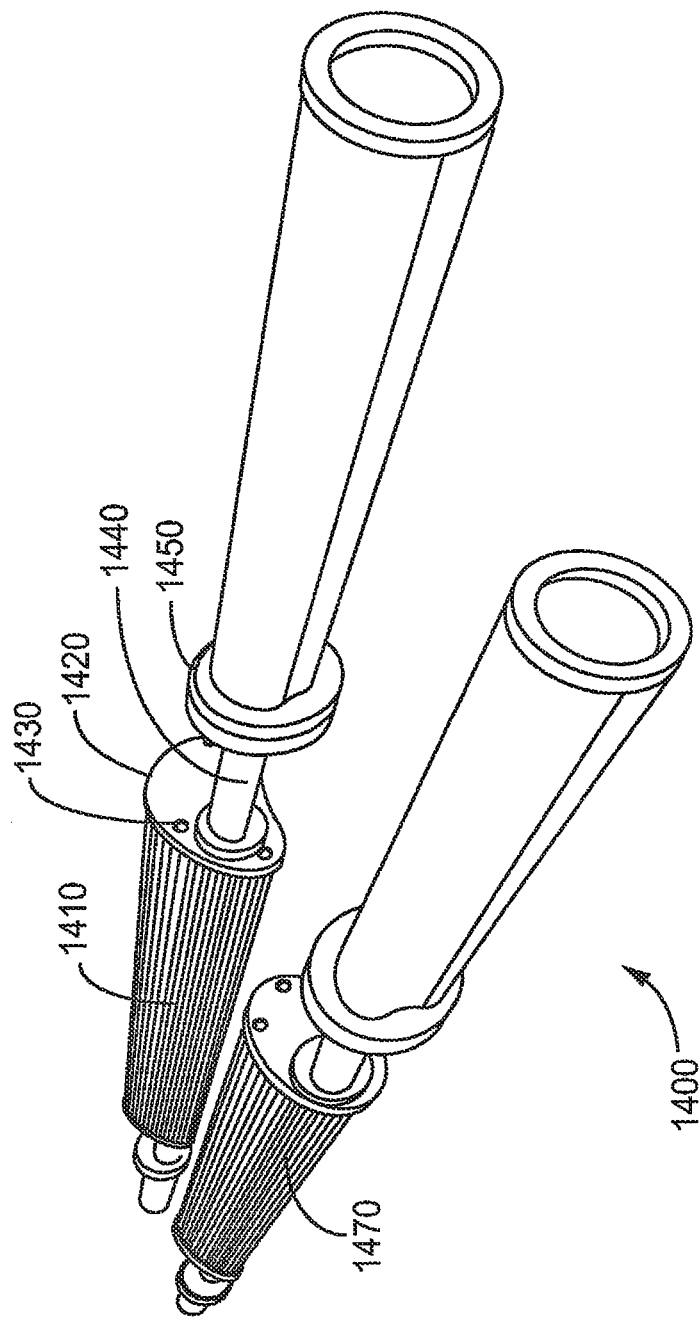

OFFSET WEIGHT BARS

CROSS-REFERENCE TO RELATED APPLICATIONS

This application is a continuation of U.S. application Ser. No. 12/838,303, filed Jul. 16, 2010 now U.S. Pat. No. 7,945,515 (allowed), which is a continuation of PCT Application Serial No. PCT/US2009/058065 filed Sep. 23, 2009 entitled "OFFSET WEIGHT BARS" which was published in English under Article 21(2) and which claims the benefit of U.S. Provisional Application Ser. No. 61/099,527, filed Sep. 23, 2008 and 61/184,549, filed Jun. 2, 2009, all of which are hereby incorporated by reference in their entirety.

BACKGROUND OF THE INVENTION

The present invention generally relates to weightlifting equipment. More specifically, the present invention relates to a weight bar for use in weightlifting wherein the weight bar is shaped to improve grip and muscle activation.

Weight training has been around for decades and if often used recreationally for fitness or appearance reasons or to improve physical performance as part of a strength or athleticism training program for sports, such as college or professional sports, for example. Typically, weightlifting or athletic training involves moving weights positioned on bars through specified ranges of motion, for example, the biceps curl or the bench press. The ranges of motion are typically associated with a physical task or muscle that the lifter wants to train, improve, or gain strength in.

The typical bar employed in most weightlifting exercises is the straight bar. The straight bar includes a grip portion for the user that is typically cylindrically shaped and is approximately one inch in diameter. Other weight bars that are sometimes employed include the EZ Curl bar, the thick-handled bar, and the triceps bar.

The EZ Curl Bar is a variant of the straight bar wherein the one-inch cylinder of the straight bar is bent at an angle away from the main axis of the bar in order to allow the lifter to grasp the bar at an angle offset from the main axis of the bar. However, even though the bar is bent, the diameter of the grip portion remains the standard one inch. Additionally, when the EZ Curl Bar is grasped, due to the angle of the bends in the bar, the weight of the bar typically is displaced below the user's palms.

The thick-handled bar is a bar with a uniform cylindrical diameter, but the diameter is greater than the one inch diameter of the standard bar. With the thick handled bar, the center of the weight of the bar remains in the user's palm, but the bar may be difficult to grasp because of its large diameter.

The triceps bar is similar to the EZ Curl bar, but typically includes a central aperture in which two one-inch diameter bars are positioned perpendicular to the main axis of the bar. As with the EZ Curl bar, the grip area of the triceps bar is typically a uniform one inch in diameter.

BRIEF SUMMARY OF THE INVENTION

One or more embodiments of the present invention provide an offset weight bar that operates in accordance with the lifter's neuro-fascial physiology to provide improved weightlifting activity. The offset weight bar operates to offset the weight of the bar and weight added to the bar away from the lifter's palm and out along the lifter's fingers. The offset includes the leverage of the weight and activates the user's neuro-fascial connections to increase muscle activation and muscle group recruitment. Additionally, the offset weight bar includes a grip portion that is shaped in accordance with the neuro-fascial connections of the user's hands to increase muscle activation and muscle group recruitment.

BRIEF DESCRIPTION OF SEVERAL VIEWS OF THE DRAWINGS

FIG. 11 illustrates a side view of the large grip section shown in FIG. 3.

FIG. 12A illustrates an end plate for the large grip section according to an embodiment of the invention.

FIG. 12B illustrates a side view of the end plate of FIG. 12A.

FIG. 14 illustrates an extended barbell offset weight bar according to an embodiment of the present invention.

DETAILED DESCRIPTION OF THE INVENTION

Figure 1:
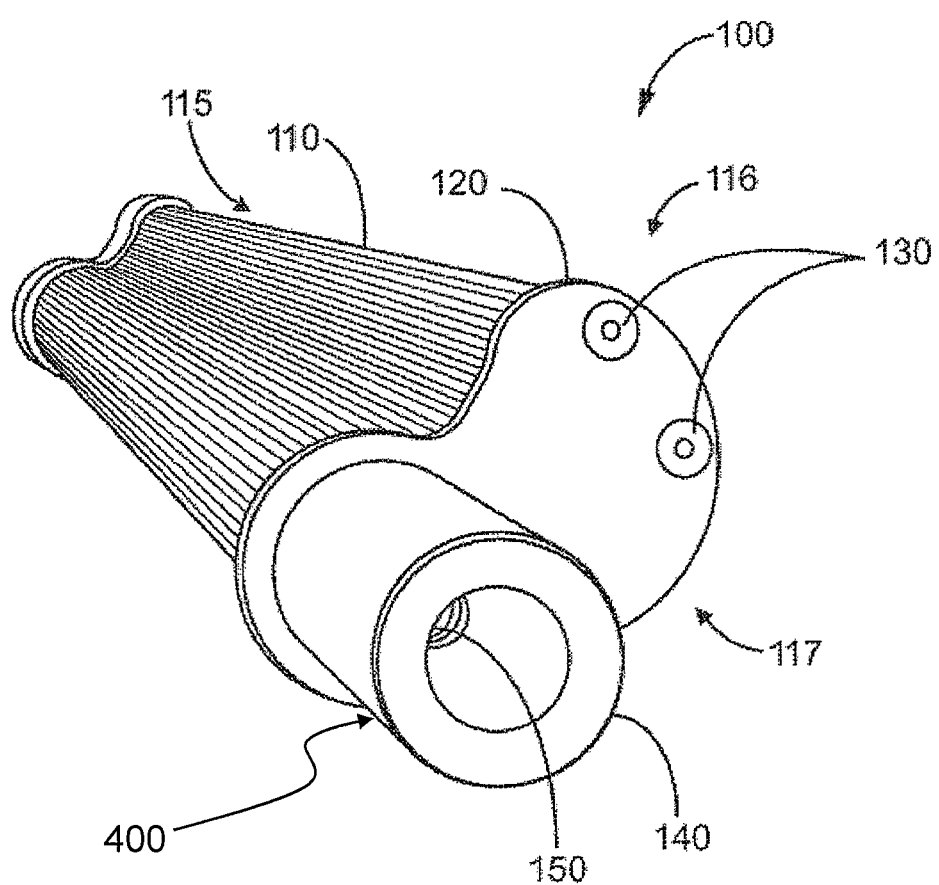
FIG. 1 illustrates an offset weight bar according to an embodiment of the present invention.

Typical weightlifting and athletic training concentrates on moving weights through certain specified ranges of motion, often those ranges of motion associated with a physical task that the trainee wants to strengthen or improve. However, the human body has a number of neuro-fascial connections or superficial connections that play a role in muscle usage and activating various muscles or muscle groups when performing specific tasks. Interestingly, it has been determined by the inventors that performing specific sports-related muscular or weightlifting tasks with standard weightlifting equipment may not coincide with specific neuro-fascial connections in the human body. Conversely, a new type of exercise equipment may be developed by studying the neuro-fascial connections in the human body and designing exercise equipment to take advantage or and/or active the desired neuro-fascial connection.

Physiologically, a neuro-facial connection may be understood to apply to the tendency of the human body to activate a second muscle or group of muscles when a first muscle or group of muscles is activated. This may occur because a muscle may be attached to or mechanically cooperate with another muscle, bone, or other tissue using fascia, and the fascia includes nerves. Consequently, when the brain activates the first muscle using nerve impulses, the nerve impulse may transmit through the fasica or through another pathway to another muscle or group of muscles and cause the second muscle or group of muscle to be activated.

For example, the standard weight bar used for a biceps curl places the center of the weight along the axis of the bar, which is held in the palm of the hand. Conversely, a study of the body's neuro-fascial connections reveals that moving the center of the weight from the lifter's palm out to the lifter's finger tips while at the same time providing a weight bar that is specifically shaped along the body's neuro-fascial pathways provides several important benefits. First, it provides more leverage and consequently causes the lifter's forearms to work harder. Second, the improved shaping increases grip strength by forcing the fingers to be used to a greater degree. Third, the improved shaping typically allows the lifter to lift without or with diminished wrist pain because the lifter is lifting as the body's neuro-fascial connections "want" the body to lift or are predisposed to mechanically and/or biologically prefer.

Stated another way, the offset weight bar according to an embodiment of the present invention may be designed to take advantage of the naturally occurring neurofascial connection in the body. The design may provide a torque on the whole bar that forces the thumb to contract to hold the bar in place. This contraction may work with the body's nervous system to recuperate and fire more muscles to be used. The result is a very noticeable benefit in muscles used and "pump" during the lift. There may also be a recuperative and/or therapeutic benefit, for example for carpal-tunnel treatment, injury prevention, and/or for the elderly.

FIG. 1 illustrates an offset weight bar 100 according to an embodiment of the present invention. As visible in FIG. 1, the offset weight bar 100 includes a grip section 110, an end plate 120, a pair of screws 130, a weight sleeve 140, and a locking nut 150. The grip section 110 includes a thumb notch 115, a palm area 116, and a finger area 117.

As illustrated further below, the screws 130 attach the end plate 120 to the grip section 110. Further, the locking nut 150 attaches the weight sleeve 140 to the end plate 120.

In operation, a user grasps the offset weight bar 100 typically by placing the open palms of both hands on the palm area 116 of the grip section 110. In that position, the user's thumbs wrap around the edge of the grip section 110 and rest in the thumb notch 115 when the user is grasping the grip section 110 firmly. The user's fingers contact the grip section 110 in the finger area 116.

As discussed above, the neuro-fascial connections in the body are utilized to increase muscle use and/or muscle group recruitment. It is noted that the offset weight bar 100 shown in FIG. 1 offsets the weight from the lifter's palm (which is located at the palm area 116) to a point out beyond the lifter's fingers (located at the finger area 117) and thumbs (located in the thumb notch 115). Additionally, the shape of the offset weight bar is contoured differently from the standard cylindrical weight bar. More specifically, the thumb curls over a ridge, but is still offset away from the fingers. Additionally, the fingers do not merely curve up, but instead the rounded bottom surface of the offset weight bar allows the lifter's fingers to be involved and used in the lift.

Figure 2:
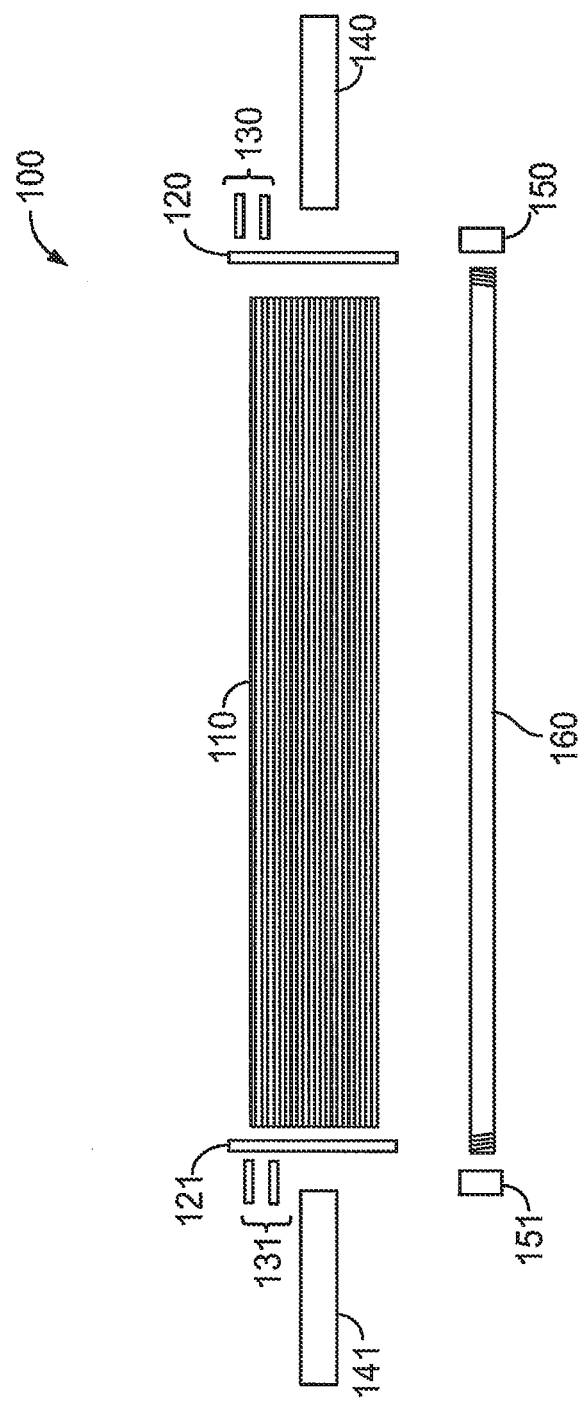
FIG. 2 illustrates an exploded view of the weight bar of FIG. 1 according to an embodiment of the present invention.

FIG. 2 illustrates an exploded view of the weight bar 100 of FIG. 1 according to an embodiment of the present invention.

As shown in FIG. 2, the weight bar 100 includes a grip section 110, first and second end plates 120-121, first and second pairs of screws 130-131, first and second weight sleeves 140-141, first and second locking nuts 150-151, and a threaded rod 160.

As further illustrated below, the interior of the grip section 110 is preferably hollow. The threaded rod 160 preferably passes through the interior of the hollow grip section 110. The threaded rod 160 is also preferably greater in length than the grip section 110 so that the threaded 160 extends past the lateral edges of grip section 110 when the threaded rod 160 is positioned inside the hollow grip section 110. As further shown below, both the first and second end plates 120-121 include an aperture and the threaded rod 160 passes through the aperture in the first and second end plates 120-121. Additionally, as further shown below, the first and second weight sleeves 140141 also include an aperture that allows the ends of the threaded rod 160 to pass through.

Once the ends of the threaded rod 160 pass through the first and second end plates 120-121 and first and second weight sleeves 140-141, the first and second locking nuts 150-151 are attached to the ends of the threaded rod 160 and tightened in order to press together and hold the weight sleeves 140-141 to the end plates 120-121 and press together and hold the end plates 120-121 to the grip section 110.

Either before or after the locking nuts 150-151 are tightened, the end plates 120-121 are attached to the grip section 110 using the first and second pairs of screws 130-131.

Figure 3:
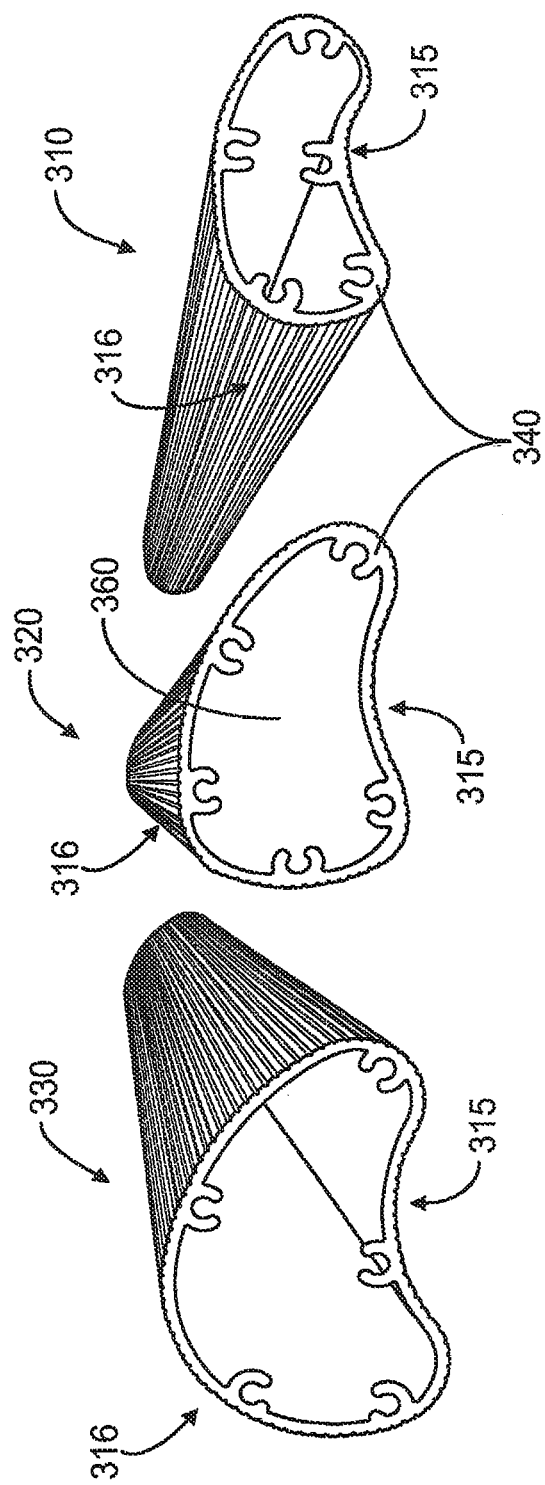
FIG. 3 illustrates an end view of three embodiments of the grip section, including a small grip section, a medium grip section, and a large grip section.

FIG. 3 illustrates an end view of three embodiments of the grip section 110, including a small grip section 310, a medium grip section 320, and a large grip section 330. In FIG. 3, the thumb notch 315 of each of the grip sections 310-330 is shown at the bottom of the grip section and the palm area 316 of each grip section 310-330 is shown at the left. Although in typical use the user would grasp the grip section 310-330 with the thumb notch 315 at the top, the grip sections 310-330 may be positioned or stored upside down as shown in FIG. 3 to prevent the grip section from rolling, for example.

Each of the grip sections 310-330 include several screw positions 340. Each screw position 340 is preferable a threaded socket for receiving a screw or bolt. Not every screw position 340 is used for a specific configuration. For example, for the configuration shown in FIGS. 1 and 2, only two of the screw positions 340 are used to attach the end plate to the grip section.

It can also be seen from FIG. 3 that the interior of the grip sections 310-330 is preferably hollow in order to allow the threaded rod 160 to pass through the grip section 310-330. Alternatively, interior of the grip sections 310-330 may be shaped in a different fashion, such as a solid piece with a hole drilled for the threaded rod 160. As a further alternative, the threaded rod need not pass through the entirety of the grip section and may instead be attached to the end of the grip section, for example, or may be part of an end plate that is in turn secured to the grip section.

The different sizes of the grip sections 310-330 shown in FIG. 3 may be useful for different hand sizes and/or while performing different exercises which may vary the neuro-fascial pathway employed in the exercise.

Figure 4:
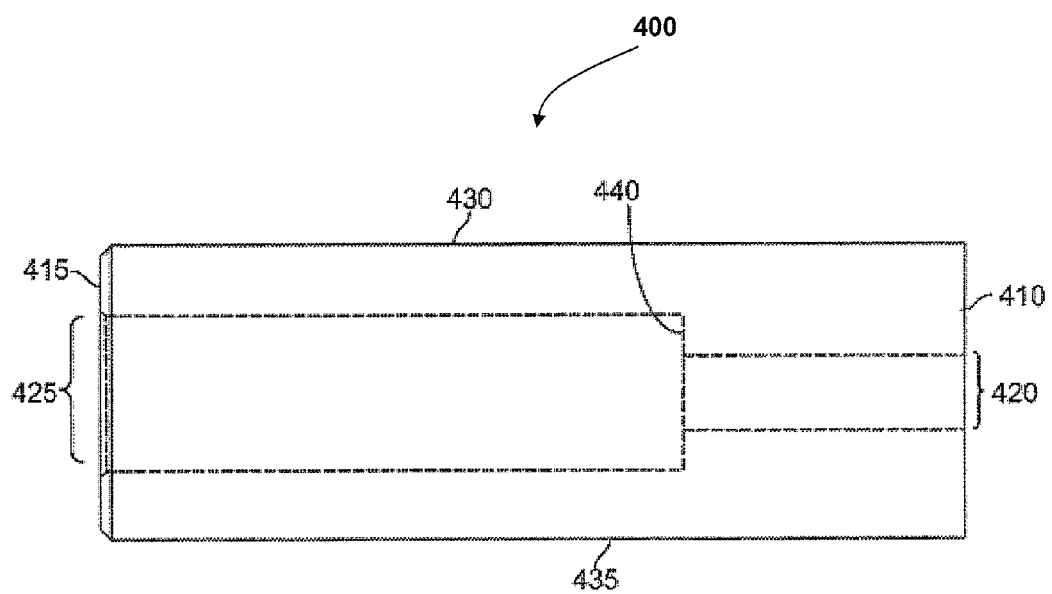
FIG. 4 illustrates a side view and an end view of the weight sleeve according to an embodiment of the invention.

FIG. 4 illustrates a side view and an end view of the weight sleeve 400 according to an embodiment of the invention. As shown in the side view, the weight sleeve 400 includes a proximal end 410, a distal end 415, a threaded rod aperture 420, a nut tightening aperture 425, an upper outer surface 430, a lower outer surface 435, and a nut restraining surface 440.

The proximal end 410 is positioned abutting the end plate and grip section when the weight sleeve 400 is assembled to form the weight bar. The distal end 415 is located opposite the proximal end 410 and is where weight plates are loaded onto the weight sleeve once the weight sleeve is assembled. The threaded rod aperture 420 is aligned along the center axis of the weight sleeve and connects with the nut tightening aperture 425 that also is aligned along the center axis of the weight sleeve.

In operation, and as described above, the threaded rod 160 preferably passes through the hollow interior of the grip section and the end of the threaded rod extends past the grip section. The end of the threaded rod 160 is then passed into the threaded rod aperture 420. The threaded rod aperture 420 is preferably sized to substantially confirm to the exterior of the threaded rod. For example, the threaded rod aperture 420 preferably allows the threaded rod 160 to pass through, but preferably is sized so that the threaded rod 160 does not jiggle or perceptively move around relative to the threaded rod aperture 420.

Once the threaded rod 160 passes through the threaded rod aperture 420, the threaded rod 160 is preferably long enough so that the end of the threaded rod 160 extends beyond the nut restraining surface 440. Once the end of the threaded rod 160 is positioned past the nut restraining surface 440, a threaded nut is introduced onto the end of the threaded rod 160. More specifically, a threaded nut is introduced to the nut tightening aperture 425 at the distal end 415 of the weight sleeve 400 and the threads of the nut are then engaged with the threaded end of the threaded rod 160 that is extending past the nut restraining surface 440.

As the nut is tightened on the end of the threaded rod 160, the nut comes into contact with the nut restraining surface 440. As the nut is further tightened, the nut generates force against the nut restraining surface 440 to press the weight sleeve 400 into contact with the end plate and grip section. FIG. 1 shows the assembled weight bar with the locking nut 150 visible through the nut tightening aperture of the weight sleeve 140, wherein the locking nut 150 induces the weight sleeve to contact the end plate 130 and grip section 110.

Figure 5:
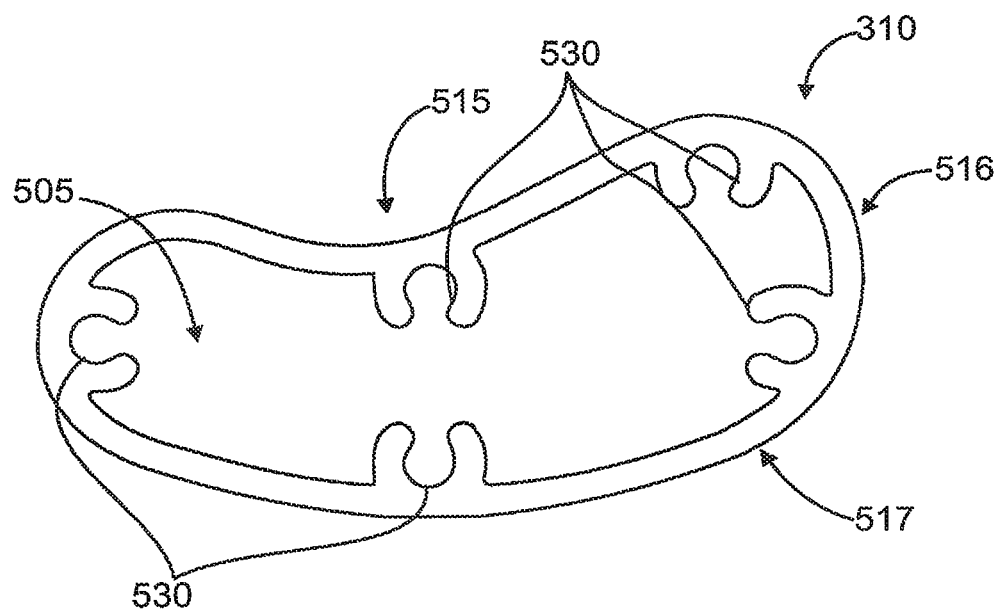
FIG. 5 illustrates a side view of the small grip section shown in FIG. 3.

FIG. 5 illustrates a side view of the small grip section 310 shown in FIG. 3. The small grip section 310 includes a threaded rod passage area 505, a thumb notch 515, a palm area 516, a finger area 517, and a plurality of screw positions, such as screw positions 530.

As discussed above, the interior of the small grip section 310 is preferably hollow and the threaded rod 160 preferably passes through the threaded rod passage area 505. The threaded rod 160 is preferably held in the threaded rod passage area because the threaded rod passes snugly through the threaded rod aperture 420 of the weight sleeve and locks the weight sleeve to the end cap, thus preferably holding the weight sleeve in a stationary position with regard to the end cap. In turn, then end cap itself is preferably held in a stationary position with regard to the grip section by attaching the end cap to the grip section using screws that are secured in at least a subset of the screw positions 530.

Thus, the end cap is preferably rigidly and stationary relative to the end of through the end cap and engage with at least some of the screw positions 530 in the grip section. In turn, the weight sleeve is preferably rigidly and stationary relative to the end cap because the threaded rod and locking nut are tightened to lock the weight sleeve to the end cap. In addition, as shown below, the end cap preferably has a weight sleeve notch for receiving the proximal end of the weight sleeve to help keep the weight sleeve stationary with regard to the end cap.

Thus, in a preferred embodiment, the threaded rod passes through the threaded rod passage area 505 without being directly locked to the small grip section 310. Alternatively, the threaded rod may be attached to the small grip section, may be formed as part of the small grip section or may be a plurality of rods.

In operation, as described above, a user grabs the small grip section 310 by placing their fingers in the finger area 517, palm in the palm area 516, and thumb in the thumb notch 516. When gripped in this fashion, the weight suspended from the weight sleeve is offset from the palm of the user's hand, thus providing an increased lever action. Additionally, the small grip section 310 is shaped to provide greater muscular involvement and neruro-fascial activation, as described above.

Figure 6:
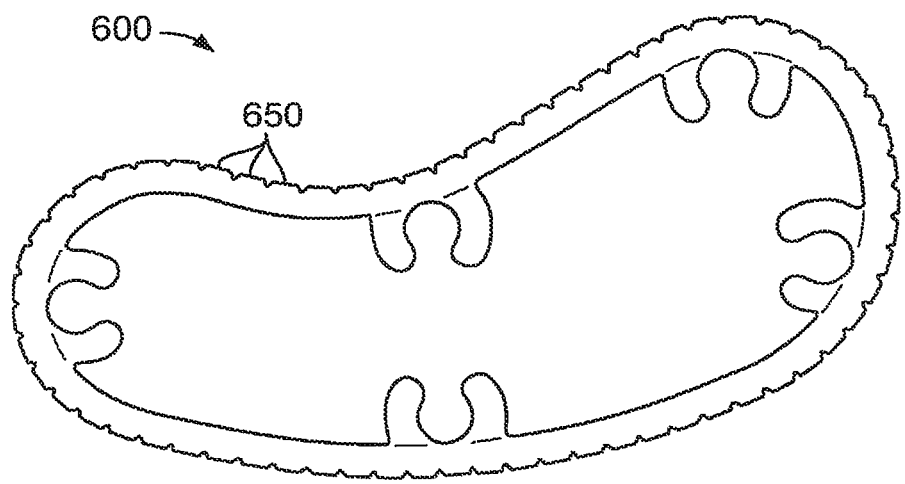
FIG. 6 illustrates an alternative improved grip design of the small grip section shown in FIG. 5.

FIG. 6 illustrates an alternative improved grip design 600 of the small grip section 310 shown in FIG. 5. The improved grip design 600 is generally similar in shape to the small grip section 310 shown in FIG. 5. However, the exterior of the small grip section 310 shown in FIG. 5 is smooth, including the thumb notch, palm area, and finger area 515-517.

Conversely, the exterior of the improved grip design 600 includes a structures may assist a user in gripping the small grip section, and may be especially useful when significant weight is added to the weight sleeve.

Although the grip improving structures shown in FIG. 6 are preferably positioned around the entire circumference of the grip section, in alternative embodiments the grip improving structures may be positioned at only a subset of the circumference of the grip section, or in discrete locations. Fir example, the grip improving structures may only extend over the thumb notch, palm area, and finger area, for example. Alternatively, the improved grip structures may occupy only one or two of the thumb notch, palm area, and finger area.

Additionally, although the grip improving structures shown in FIG. 6 are preferably uniform around the circumference of the grip section, in alternative embodiments, the grip structures themselves need not be uniform. For example, the grip structures may be composed of ridges similar to the grip ridges 650, but the height and/or spacing of the grip ridges may vary with the location of the grip ridge on the grip section. For example, large, infrequently spaced ridges may be positioned in the thumb notch while lower, more frequently spaced ridges may be positioned in the finger area. Alternatively, the grip improving structures need not be ridges and may be other devices for improving grip. For example, the grip improving structure may be an inset, adhesive, or extrusion made of a material know to improve grip, such as rubber or foam.

Additionally, although the grip improving structures shown in FIG. 6 preferably extend the length of the grip section, in alternative embodiments the grip improving structures may occupy only a subset of the length of the grip section. For example, the grip improving structures may be limited to a location approximately should width on a user. Positioning the grip improving structures in such a way may help a user position their hands in a way to improve muscular activation.

Figure 7B:
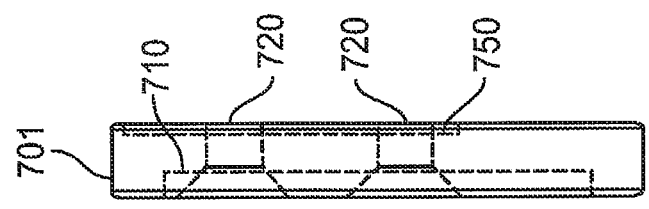
FIG. 7B illustrates a side view of the end plate of FIG. 7A.
Figure 7A:
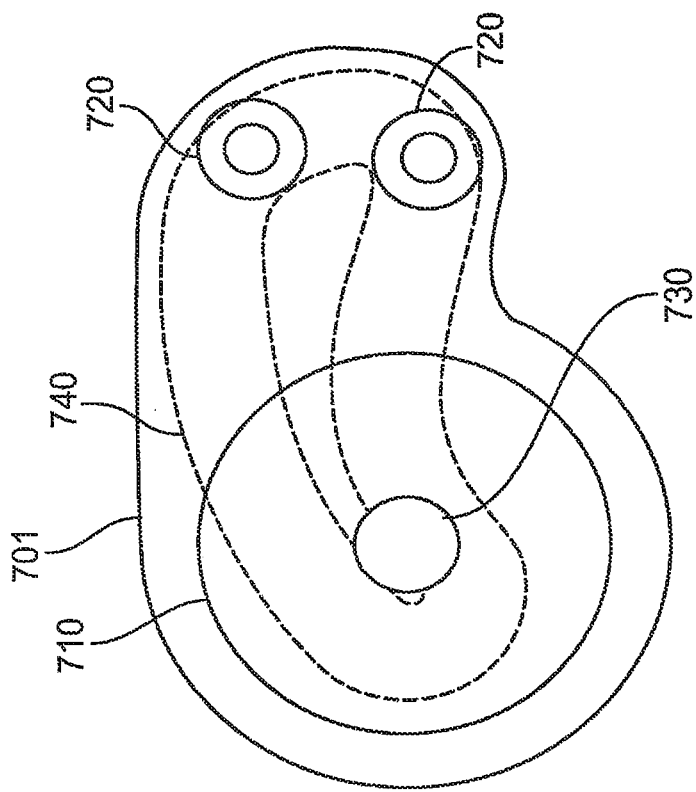
FIG. 7A illustrates an end plate for the small grip section according to an embodiment of the invention.

FIG. 7A illustrates an end plate 701 for the small grip section according to an embodiment of the invention. The end plate 710 includes a weight sleeve receiving notch 710, a plurality of screw holes 720, a threaded rod aperture 730, and a dotted line 740 representing the relative location of the exterior of the small grip section when the end plate 701 is positioned relative to the small grip section.

As discussed above, the end plate 701 is attached to the small grip section by screws that pass through the screw holes 720 of the end plate 701 and engage with a plurality of the screw positions 530 of the small grip section as shown in FIG.

5. Additionally, as described above, the threaded rod passes through the interior of the small grip section and passes through the interior of the threaded rod aperture 730 of the end plate 701 before passing into the threaded rod aperture 420 on the proximal end 410 of the weight sleeve 400 as shown in FIG. 4.

As described above with regard to FIG. 4, once the locking nut is engaged with the threaded rod, tightening the locking nut engages the weight sleeve with the end plate 701. More specifically, tightening the locking nut causes the proximal end 410 of the weight sleeve 400 to be introduced into the weight sleeve receiving notch 710. The weight sleeve receiving notch 710 is preferably sized to snugly fit the proximal end of the weight sleeve in order to minimize jiggling and/or moving around of the weight sleeve relative to the end plate 701. Consequently, the weight sleeve receiving notch 710 operates in cooperation with the threaded rod and locking nut to position the weight sleeve in a rigid stationary fashion with regard to the end plate and grip section.

FIG. 7B illustrates a side view of the end plate 701 of FIG. 7A. As shown in FIG. 7B, the end plate 701 includes the weight sleeve receiving notch 710 shown in dotted lines, as well as the screw holes 720, also shown in dotted lines.

As illustrated in FIG. 7B, the end plate 701 may also include a grip section notch 750. The grip section notch 750 may engage with the edge of the small grip section to help hold the small grip section in a rigid, stationary relationship with the end plate 701.

Alternatively, the end plate 701 may not be equipped with a notch or may use some other positioning structure to help maintain the position of the end plate 701 relative to the weight sleeve and/or grip section. For example, instead of a notch, a pin or ridge or series of pins or ridges may be employed either on the end plate or on one or more of the weight sleeve and/or grip section. Alternatively, the end plate 701 may be secured to the weight sleeve using screws the pass through a ridge on an alternative weight sleeve or engage with screw positions on an alternative weight sleeve.

Figure 8:
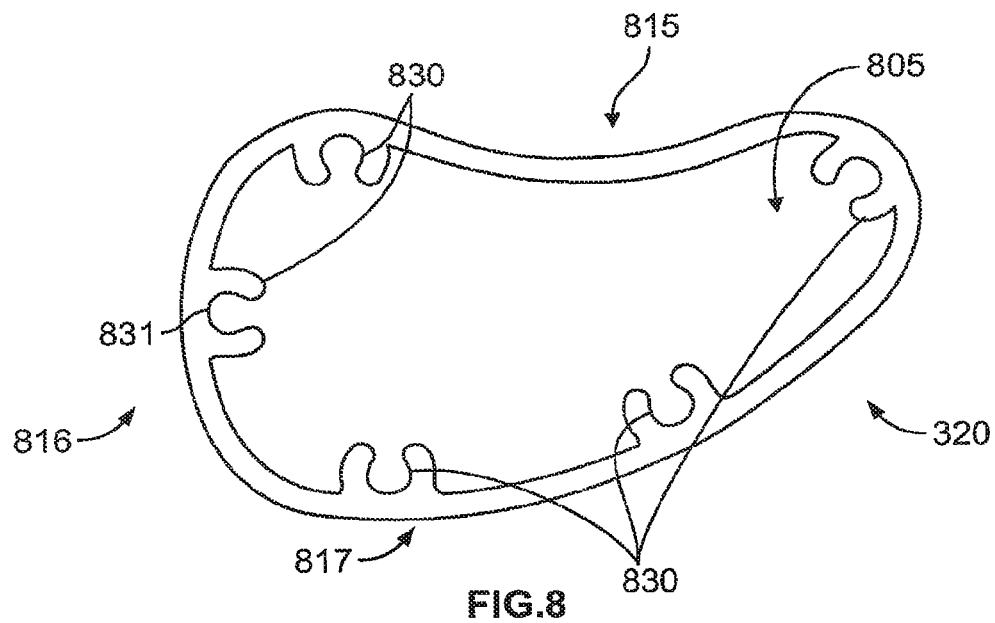
FIG. 8 illustrates a side view of the medium grip section shown in FIG. 3.

FIG. 8 illustrates a side view of the medium grip section 320 shown in FIG. 3. Similar to the small grip section 310 described in FIG. 5, the medium grip section 320 includes a threaded rod passage area 805, a thumb notch 815, a palm area 816, a finger area 817, and a plurality of screw positions, such as screw positions 830.

The threaded rod passage area 805, thumb notch 815, palm area 816, finger area 817, and screw positions 830 operate in substantially the same way in the medium grip section 320 as they were described above with regard to the small grip section 310 in FIG. 5. The same alternatives also apply.

One difference is that the medium grip section includes an additional screw position 831 that the small grip section did not include. The additional screw position may be employed in a fashion similar to the other screw positions for receiving a screw passing through an end plate to attach the end plate to the end of the grip section.

One additional difference between the medium grip section and the small grip section is the shape of the grip section. As described above, a differently shaped grip section may be desirable for users with different hand sizes, somewhat different neurofascial pathways, or when performing different exercises that alter the employed neurofascial pathway.

Figure 9:
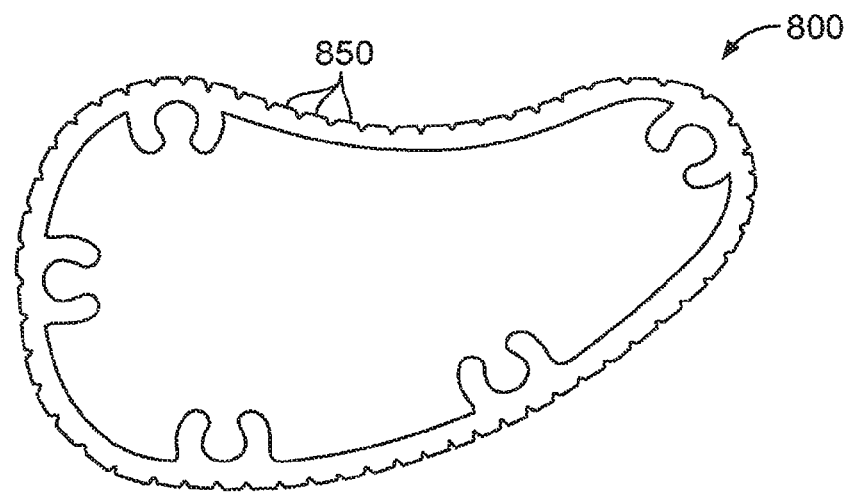
FIG. 9 illustrates an alternative improved grip design of the medium grip section shown in FIG. 6.

FIG. 9 illustrates an alternative improved grip design 900 of the medium grip section 320 shown in FIG. 6. The improved grip design 900 is generally similar in shape to the medium grip section 320 shown in FIG. 8. However, the exterior of the medium grip section 320 shown in FIG. 8 is smooth, including the thumb notch, palm area, and finger area 815-817. Conversely, the exterior of the improved grip design 900 includes a plurality of grip improving structures, such as the grip ridges 950. The grip improving structures may assist a user in gripping the small grip section, and may be especially useful when significant weight is added to the weight sleeve.

The alternative improved grip design 900 shown in FIG. 9 for the medium grip section 320 corresponds to the improved grip design 600 shown in FIG. 6 for the small grip section 310. Consequently, the same operation and alternatives described above with regard to the improved grip design 600 of FIG. 6 apply to the improved grip design 900 of FIG. 9.

Figure 10B:
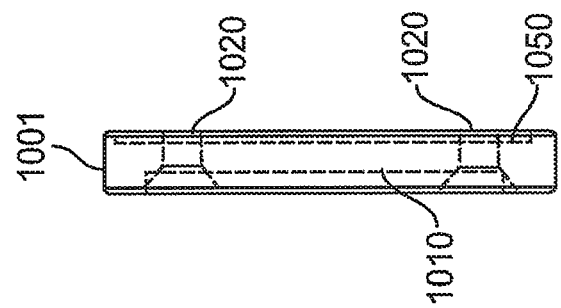
FIG. 10B illustrates a side view of the end plate of FIG. 10A.
Figure 10A:
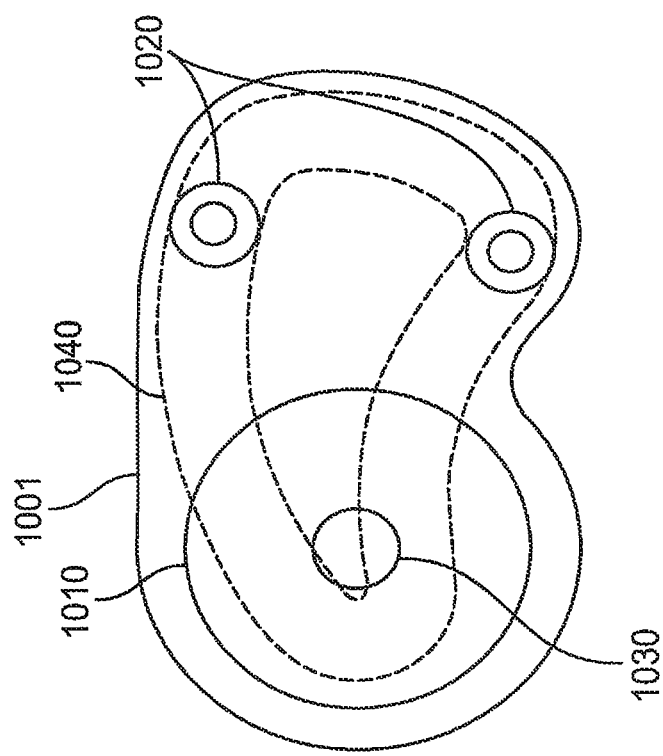
FIG. 10A illustrates an end plate for the medium grip section according to an embodiment of the invention.

FIG. 10A illustrates an end plate 1001 for the medium grip section according to an embodiment of the invention. The end plate 1010 includes a weight sleeve receiving notch 1010, a plurality of screw holes 1020, a threaded rod aperture 1030, and a dotted line 1040 representing the relative location of the exterior of the medium grip section when the end plate 1001 is positioned relative to the medium grip section.

As discussed above, the end plate 1001 is attached to the medium grip section by screws that pass through the screw holes 1020 of the end plate 1001 and engage with a plurality of the screw positions 830 of the medium grip section as shown in FIG. 8. Additionally, as described above, the threaded rod passes through the interior of the medium grip section and passes through the interior of the threaded rod aperture 1030 of the end plate 1001 before passing into the threaded rod aperture 420 on the proximal end 410 of the weight sleeve 400 as shown in FIG. 4.

Thus, the end plate 1001 of FIG. 10A operates in a similar fashion to the end plate 701 of FIG. 7A as described above, and the same alternatives apply. One additional alternative is that the end plate 1001 may include an additional screw hole to allow a screw to connect the end plate 1001 to the additional screw position 831 shown in FIG. 8.

FIG. 10B illustrates a side view of the end plate 1001 of FIG. 10A. As shown in FIG. 10B, the end plate 1001 includes the weight sleeve receiving notch 1010 shown in dotted lines, as well as the screw holes 1020, also shown in dotted lines. As illustrated in FIG. 10B, the end plate 1001 may also include a grip medium grip section to help hold the medium grip section in a rigid, stationary relationship with the end plate 1001.

One difference between the end plate 701 of FIG. 7B and the end plate 1001 of FIG. 10B is that the grip section notch 1050 of FIG. 10 is shaped differently from the grip section notch 750 of FIG. 7. The notches are shaped differently to accommodate the different shapes of the small grip section and medium grip section. In other ways, the end plate 1001 of FIG. 10B operates in a similar fashion to the end plate 701 of FIG. 7B as described above, and the same alternatives apply.

FIG. 11 illustrates a side view of the large grip section 330 shown in FIG. 3. Similar to the small grip section 310 described in FIG. 5, the large grip section 330 includes a threaded rod passage area 1105, a thumb notch 1115, a palm area 1116, a finger area 1117, and a plurality of screw positions, such as screw positions 1130.

The threaded rod passage area 1105, thumb notch 1115, palm area 1116, finger area 1117, and screw positions 1130 operate in substantially the same way in the large grip section 330 as they were described above with regard to the small grip section 310 in FIG. 5 and the medium grip section 320 in FIG. 8. The same alternatives also apply.

One additional difference between the large grip section and the small and medium grip sections is the shape of the grip section. As mentioned above, different grip section profiles may be useful when lifters have different hand sizes, have somewhat different neuro-fascial pathways, or are performing exercises that activate or employ different neurofascial pathways.

Additionally, FIG. 11 illustrates the improved grip design of the large grip section 330. That is, the exterior of the improved grip design includes a plurality of grip improving structures, such as the grip ridges 1150. The grip improving structures may assist a user in gripping the small grip section, and may be especially useful when significant weight is added to the weight sleeve.

The improved grip design 1100 shown in FIG. 11 for the large grip section 330 corresponds to the improved grip design 600 shown in FIG. 6 for the small grip section 310 and the improved grip design 900 for the medium grip section 320 shown in FIG. 9. Consequently, the same operation and alternatives described above with regard to the improved grip design 600 of FIG. 6 and the improved grip design 900 of FIG. 9 apply to the improved grip design 1100 of FIG. 11.

Additionally, the basic design without grip improving structures, may be employed for the large grip section 330, similar to that shown in FIG. 5 for the small grip section 310 and FIG. 8 for the medium grip section 320.

FIG. 12A illustrates an end plate 1201 for the large grip section according to an embodiment of the invention. The end plate 1210 includes a weight sleeve receiving notch 1210, a plurality of screw holes 1220, a threaded rod aperture 1230, and a dotted line 1240 representing the relative location of the exterior of the large grip section when the end plate 1201 is positioned relative to the large grip section.

As discussed above, the end plate 1201 is attached to the large grip section by screws that pass through the screw holes 1220 of the end plate 1201 and engage with a plurality of the screw positions 1130 of the large grip section as shown in FIG. 11. Additionally, as described above, the threaded rod passes through the interior of the large grip section and passes through the interior of the threaded rod aperture 1230 of the end plate 1201 before passing into the threaded rod aperture 420 on the proximal end 410 of the weight sleeve 400 as shown in FIG. 4.

Thus, the end plate 1201 of FIG. 12A operates in a similar fashion to the end plate 701 of FIG. 7A and the end plate 1001 of FIG. 10A as described above, and the same alternatives apply.

FIG. 12B illustrates a side view of the end plate 1201 of FIG. 12A. As shown in FIG. 12B, the end plate 1201 includes the weight sleeve receiving notch 1210 shown in dotted lines, as well as the screw holes 1220, also shown in dotted lines.

As illustrated in FIG. 12B, the end plate 1201 may also include a grip section notch 1250. The grip section notch 1250 may engage with the edge of the large grip section to help hold the large grip section in a rigid, stationary relationship with the end plate 1201.

One difference between the end plates 701, 1001 of FIGS. 7B, 10B and the end plate 1201 of FIG. 12B is that the grip section notch 1250 of FIG. 12 is shaped differently from the grip section notches 750, 1050 of FIGS. 7B, 10B. The notches are shaped differently to accommodate the different shape of the large grip section in FIG. 12B as opposed to the small and medium grip sections in FIGS. 7B and 10B. In other ways, the end plate 1201 of FIG. 12B operates in a similar fashion to the end plates 701, 1001 of FIGS. 7B, 10B as described above, and the same alternatives apply.

Figure 13:
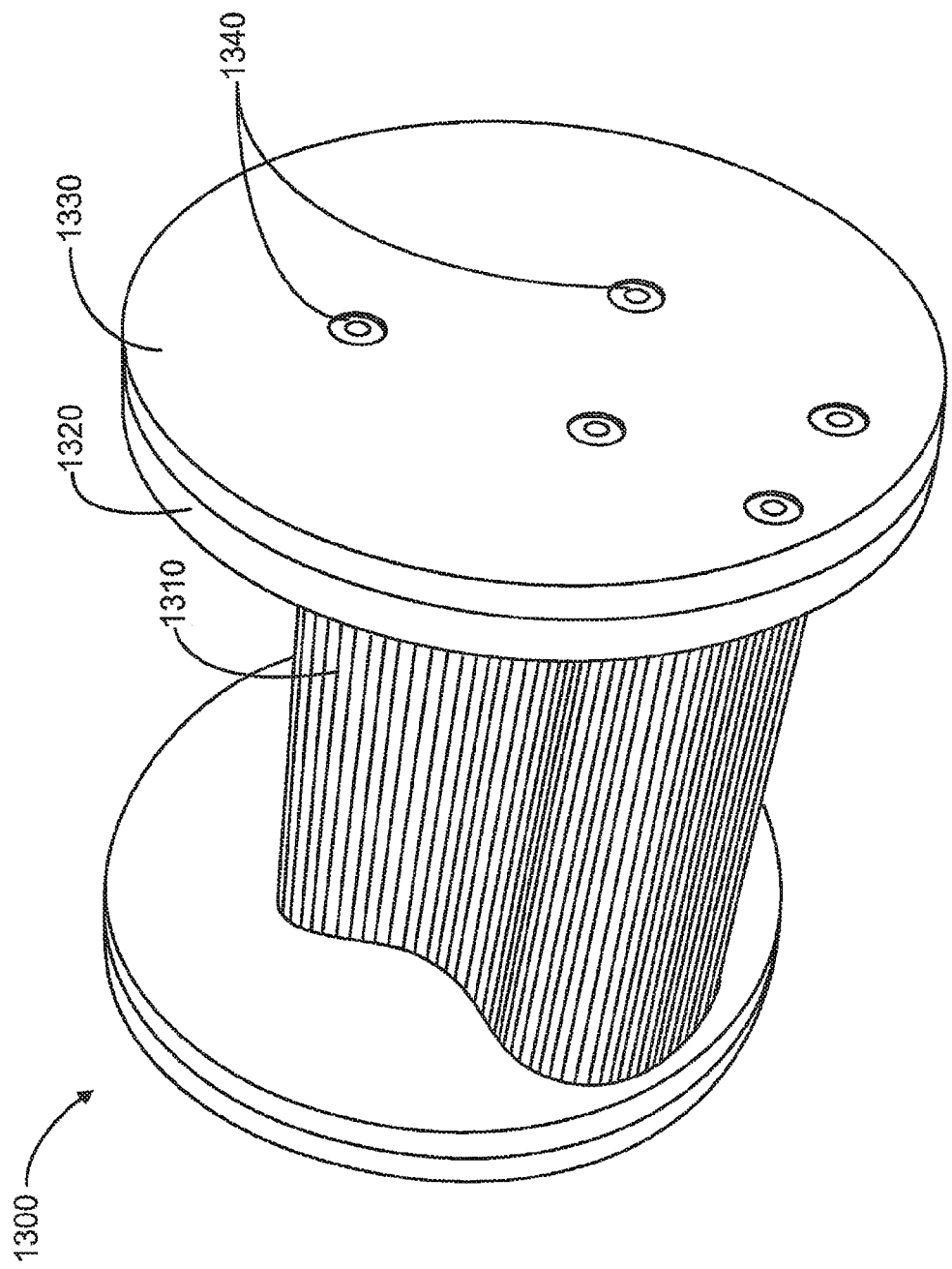
FIG. 13 illustrates a dumbbell offset weight bar according to an embodiment of the present invention.

FIG. 13 illustrates a dumbbell offset weight bar 1300 according to an embodiment of the present invention. The dumbbell offset weight bar 1300 includes a dumbbell grip section 1310, a dumbbell grip section receiving plate 1320, an dumbbell end plate 1330, and a plurality of screws 1340.

The dumbbell grip section 1330 is similar to the grip sections previously described above. That is, the dumbbell grip section 1330 may be shaped in accordance with any of the small grip section, medium grip section, or large grip section. However, the length of the dumbbell grip section 1330 is considerably shorter than the previous three grip sections so that it is suitable for use in a dumbbell rather than in a bar. For example, the length of the previous three sections may be from 2-5 feet, for example, with common bar lengths such as 36 inched being preferred. Conversely, the length of the dumbbell grip section 1330 may be from 6 to 18 includes, for example, with common dumbbell lengths such as 10 inches being preferred.

The dumbbell grip section 1330 includes a plurality of screw positions as shown above in FIGS. 5, 8, and 11. The dumbbell receiving plate 1320 includes a plurality of holes (not shown) that align with the screw positions so that screws may pass from the end plate 1330 through the holes in the dumbbell receiving plate 1320 and engage with the screw positions of the dumbbell grip section 1330.

Similar alternatives to those described above with regard to grip structures and other configurations may also be employed with the dumbbell grip section. In addition, the edge of the dumbbell receiving plate 1320 facing the dumbbell grip section 1330 may include a notch for receiving the edge of the dumbbell grip section similar to the notches described above with regard to the end plates.

FIG. 14 illustrates an extended barbell offset weight bar 1400 according to an embodiment of the present invention. The extended barbell offset weight bar 1400 includes a grip section 1410, a grip section receiving plate 1420 having a plurality of screws 1430, a bar extension 1440, and a weight sleeve 1450.

The grip section 1410 of the extended barbell offset weight bar 1400 is similar to the grip sections previously described above. That is, the grip section 1410 may be shaped in accordance with any of the small grip section, medium grip section, or large grip section. However, the length of the grip section 1410 is sized to allow the placement of the extended barbell offset weight bar 1400 in a weight bench, such as for the bench press, for example. That is, a typical weight bench operates with accommodates the standard weightlifting bar, which is fairly narrow. Conversely, the grip section 1410 of the extended barbell offset weight bar 1400 is fairly wide and thus may not fit the hook, notch, or other engagement device employed by a weight bench to support the weight bar when it is not being lifted. Consequently, the lateral length of the grip section 1410 is curtailed so that the bar extension 1440 is exposed and the weight supporting elements of the weight bench may engage with the bar extension 1440, which is of the typical size of a weight bar.

To construct the extended barbell offset weight bar 1400, the grip section 1410 includes a plurality of screw positions as described above with regard to the small, medium, and large grip sections. The grip section receiving plate 1420 is attached to the grip section 1410 by passing screws through the holes in the grip section receiving plate 1420 and engaging the screws with the screw positions in the grip section 1410. Similar to the threaded rod described above, the bar extension 1440 is the exposed portion of a standard weight bar that passes through the center of the hollow grip section 1410. After the weight bar is passes through the grip section 1410, the weight sleeves 1450 are added to each side of the weight bar according to the standard process.

In FIG. 14, the profile of the grip section 1410 may be seen to be the same as the large grip section described above and the profile of the grip section 1470 may be seen to be the same as the medium grip section described above. The small grip section may also be employed.

Figure 15:
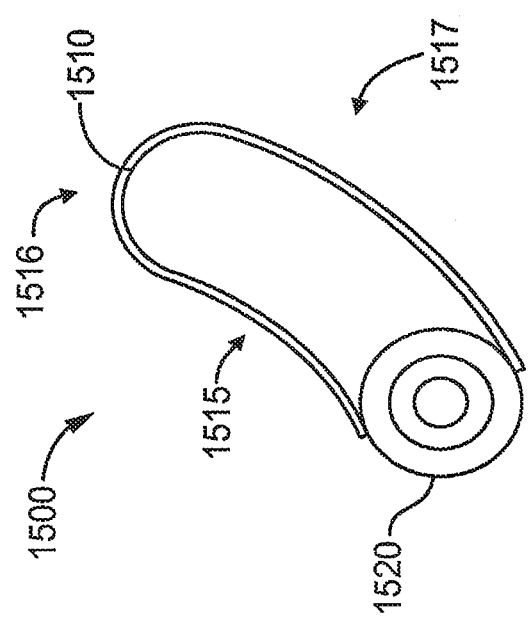
FIG. 15 illustrates an alternative embodiment of the small grip section shown in FIG. 5 above.

FIG. 15 illustrates an alternative embodiment 1500 of the small grip section shown in FIG. 5 above. The alternative embodiment 1500 includes a grip section 1510 and a standard weight bar 1520. The thumb notch 1515, palm area 1516, and finger area 1517 are also shown.

The embodiment of FIG. 15 is constructed by welding or otherwise adhering the grip section 1510 to a standard weight bar 1520. Although the profile for the grip section 1510 shown in FIG. 15 may be different from the profile shown for the small grip section in FIG. 5, the profile shown in FIG. 5 may be employed in the embodiment shown in FIG. 15 and vice versa.

Figure 16:
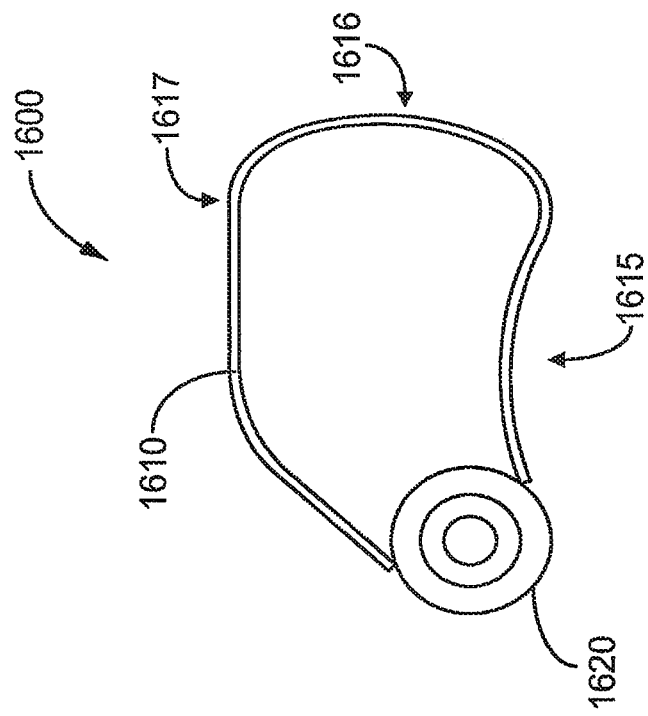
FIG. 16 illustrates an alternative embodiment of the medium grip section shown in FIG. 8 above.

FIG. 16 illustrates an alternative embodiment 1600 of the medium grip section shown in FIG. 8 above. The alternative embodiment 1600 includes a grip section 1610 and a standard weight bar 1620. The thumb notch 1615, palm area 1616, and finger area 1617 are also shown.

The embodiment of FIG. 16 is constructed by welding or otherwise adhering the grip section 1610 to a standard weight bar 1620. Although the profile for the grip section 1610 shown in FIG. 16 may be different from the profile shown for the medium grip section in FIG. 8, the profile shown in FIG. 8 may be employed in the embodiment shown in FIG. 16 and vice versa.

One or more embodiments of the invention include a weight bar having a grip portion that allows the weight bar to be gripped in such a fashion that the weight of the weight bar is offset from the typical musculoskeletal position where the weight of a standard weight bar is normally felt. For example, the grip portion may cause the weight of the weight bar to be felt more heavily in the fingers of a lifter than in the palm area of a lifter, as is the case with a normal weight bar. Such an offset weight bar may provide the advantage of increased activation and/or targeting of specific muscles, tendons, or other anatomical features.

Although the embodiments discussed above employ screws to attach to the grip sections, bolts, rivets, adhesives, welding, or other attachment mechanisms may be employed.

Additionally, the different diameters and/or curvatures shown in the grip sections may be useful in activating different muscles, for comfort of the user, or for ergonomic factors. Also, the weight bars may be used as they are, or additional weight may be added to the weight sleeves of the weight bars to provide further resistance for the user. For the dumbbell, the dumbbell receiving plate or the end plate may be expanded to vary the weight of the dumbbell.

As shown in the drawings above, the thumb notch is a displacement inward toward the axis of the grip section. Also, the finger section preferably has a different radius of curvature from the palm section, which in turn preferably has a different radius of curvature from the thumb notch, although in an alternative embodiment, two of the radii of curvature may be the same.

As also shown from the drawings, the hand of a user using the grip section is "open" in the sense that the user's fingers do not come into contact with the user's palm or thumb.

As discussed herein, the term standard barbell may mean an Olympic standard sized barbell or any of a variety of standardizes sizes in use around the world.

Also, although much of the discussion above is with regard to the usage of the offset weight bar using a supinate grip, the offset weight bar may be used with a number of other grips, such as pronate grip. Additionally, the shape of the grip may allow a user to grip the weight bar using a number of novel gripping positions. For example, the user's palm may be placed in the finger area instead or may be positioned over the thumb notch instead. As a further alternative, the user's fingers may be placed in the thumb notch. These additional positions may provide the user with benefits such as improved ergonomics, increased muscular activation, or increased activation of muscle groups.

Additionally, the offset weight bar need not be used in the hand alone. For example, a user may use the offset weight bar when performing Zercher activities, such as by holding the weight bar in a bent elbow against the chest. Additionally, the offset weight bar may be employed when performing squats, for example, and may be preferable because the contour of the weight bar may correspond to the lifter's shoulders to a greater degree than the standard weight bar. The offset weight bar may be useful for both front squat and rear squat.

Additionally, it is noted that the increased muscle activation of one or more of the embodiments of the present invention may provide for increased muscle strength, especially increased muscle strength of the forearms.

Additionally, one or more of the embodiments of the present invention may be employed in a therapeutic or injury prevention exercise program. For example, use of the offset weight bar may help activate muscles that may be weakened in a user—for example muscles that have been weakened in the elbow—and may thus help prevent an injury or be therapeutic. The offset weight bar may also help improve muscle symmetry in the elbow.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A method for lifting weights for muscle development, comprising:
    gripping, with at least one hand, a grip region of a weight bar having weights thereon, wherein during said gripping a first portion of the grip region resides in the palm of the hand and a second portion of the grip region resides out of the palm and is engaged on opposite sides by the fingers and thumb of the hand, the grip region configured as a tubular member having a fixed circumference and a continuous outer surface defining said first portion and said second portion, with a longitudinally-extending thumb notch in the second portion in which the thumb resides during said gripping, and further configured to offset the weight of the weights away from the palm in the direction of the thumb and fingers so as to cause torque that is resisted by contraction of muscles supporting the thumb during said gripping; and
    performing a weight lifting activity by moving the weight bar while continuing said gripping, so as to result in muscle activation that stimulates muscle development.

2. The method of claim 1, wherein said weights are removably received on said weight bar.

3. The method of claim 1, wherein said muscles are in a forearm.

4. The method of claim 3, wherein said weight lifting activity is for providing increased muscle strength of the forearm.

5. The method of claim 4, wherein said gripping is with two hands.

6. The method of claim 1, wherein during said gripping the thumb curls over a ridge of said grip section and is offset from the fingers.

7. The method of claim 1, wherein said torque is also resisted by contraction of muscles supporting the fingers.

8. The method of claim 1, wherein said weight lifting activity is for providing increased muscle symmetry in an elbow.

9. An offset weight bar, comprising:
a weight bar with a grip section having a non-cylindrical shape in cross-section and comprised of a tubular member having a fixed circumference and defining a continuous outer surface including a first grip region for receipt within the palm of a hand of a user and a second grip region configured to reside out of the palm to be engaged by the fingers and thumb of the hand on opposite sides of the second grip region; the second grip region including a longitudinally-extending thumb notch for receiving the thumb of the hand; and
the weight bar further configured to offset weight on the weight bar away from the palm in the direction of the thumb and fingers sufficiently to result in torque that will cause contraction of muscles supporting the thumb during a weight lifting activity with said weight bar.

10. The offset weight bar of claim 9 wherein said first grip region has a radius of curvature that differs from that of said second grip region.

11. The offset weight bar of claim 9 wherein said tubular member defines a closed circumference with said longitudinally-extending thumb notch defined as a concavely curved surface of the closed circumference.

12. The offset weight bar of claim 9, which comprises first and second sleeve regions for removably receiving weights, the first and second sleeve regions positioned on opposed sides of said grip section.

13. The offset weight bar of claim 12, also comprising weights removably received on said sleeve regions.

14. The offset weight bar of claim 9, also comprising non-removable weights fixed to said weight bar.

15. The offset weight bar of claim 9, also comprising a plurality of grip-enhancing structures on said grip section.

16. An offset weight bar, comprising:
a weight bar with a grip section having a non-cylindrical outer shape in cross-section, the grip section comprised of a tubular member having a fixed circumference and defining a continuous outer surface including a first elongate rounded portion adjacent and extending generally parallel to a second elongate rounded portion, the first rounded portion having a curved surface configured for receipt within the palm of a hand of a user and the second rounded portion configured to reside out of the palm and positioned to be engaged by the fingers and thumb of the hand on opposite sides of the second rounded portion, the first rounded portion having a first longitudinal grip axis and the second rounded portion having a second longitudinal grip axis generally parallel to but offset from the first longitudinal axis;
first and second weight sleeves respectively located on opposed sides of said grip section, with the longitudinal axes of the first and second weight sleeves being offset from said first longitudinal grip axis sufficient to offset the center of mass of weights mounted on the sleeves away from the palm of the hand when said curved surface of the first rounded portion is received in the palm of the hand.

17. The offset weight bar of claim 16, wherein said grip section is comprised of a hollow tubular member.

18. The offset weight bar of claim 17, also comprising a plurality of grip-enhancing structures on said grip section.

19. The offset weight bar of claim 16, wherein said first rounded portion has a radius of curvature greater than that of said second rounded portion.

20. The offset weight bar of claim 16, wherein said first rounded portion has a maximum radius of curvature greater than that of said weight sleeves.

* * * * *